Nov. 17, 1942.  E. R. GASSER  2,302,496
TORSION DYNAMOMETER
Filed Aug. 19, 1939  4 Sheets-Sheet 1
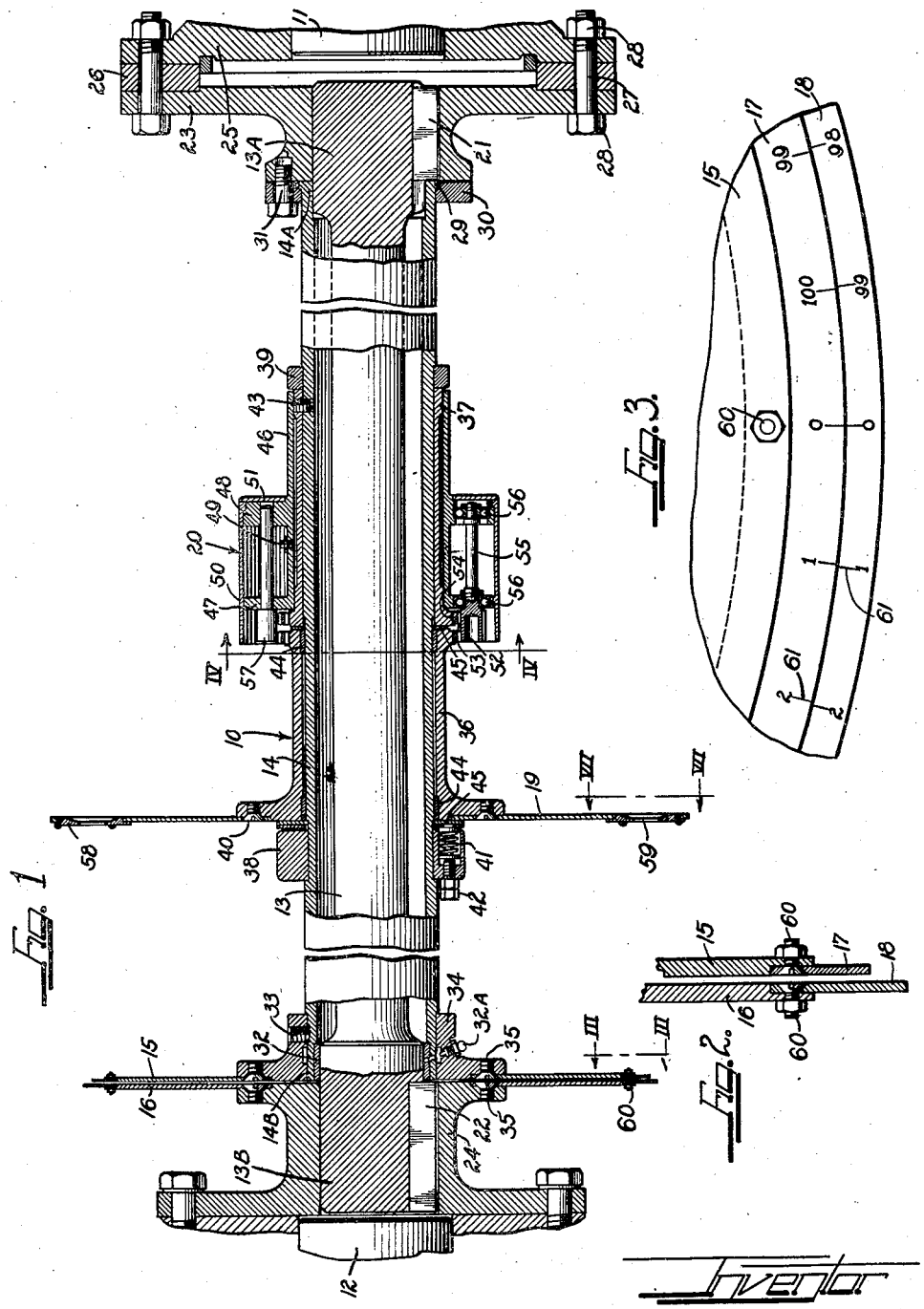
EMIL R. GASSER Nov. 17, 1942.  E. R. GASSER  2,302,496
TORSION DYNAMOMETER
Filed Aug. 19, 1939  4 Sheets-Sheet 2
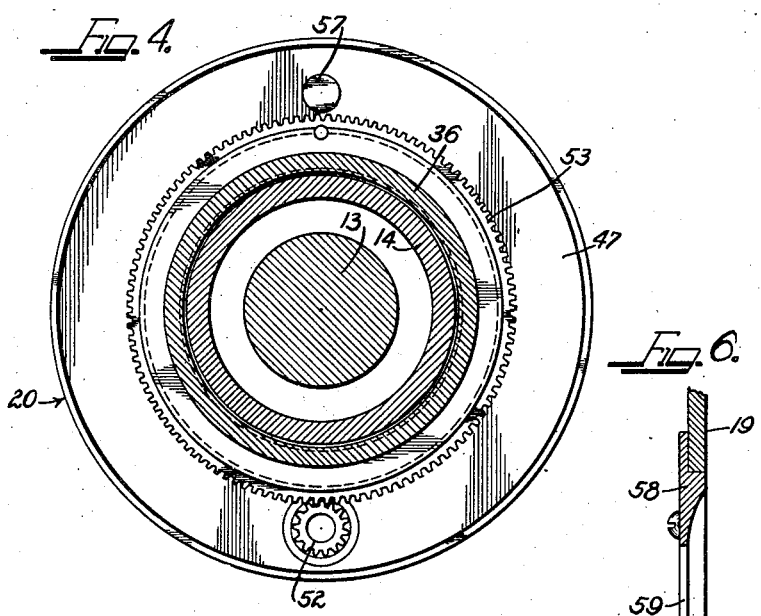
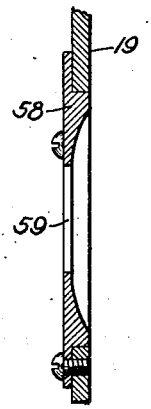
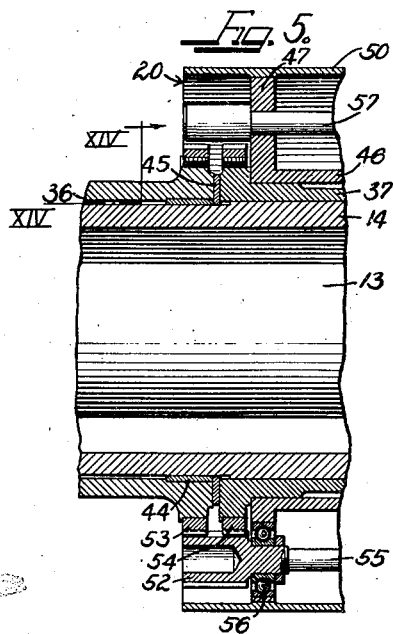
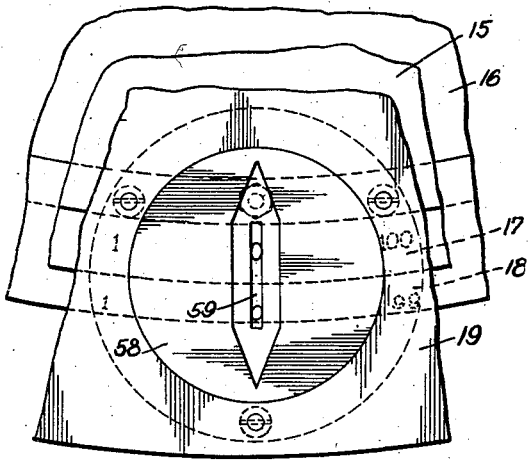
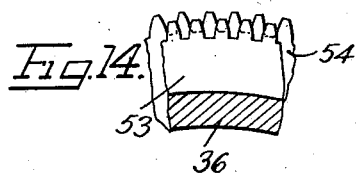
Inventor
EMIL R. GASSER

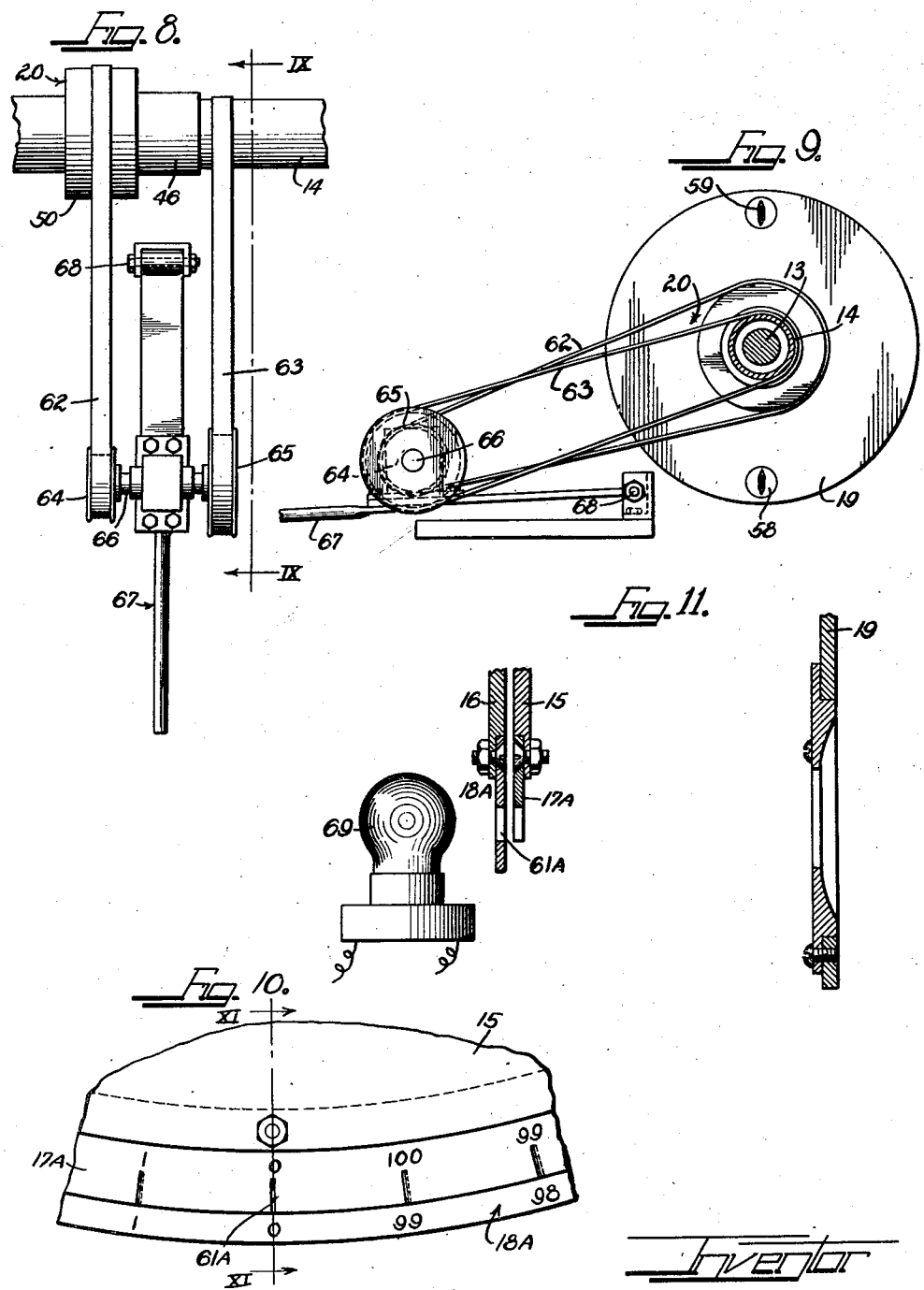

Nov. 17, 1942. E. R. GASSER 2,302,496
TORSION DYNAMOMETER
Filed Aug. 19, 1939 4 Sheets-Sheet 4

Inventor
EMIL R. GASSER

Patented Nov. 17, 1942

2,302,496

UNITED STATES PATENT OFFICE 2,302,496

TORSION DYNAMOMETER

Emil R. Gasser, Buffalo, N. Y., assignor to Farrel-Birmingham Company, Incorporated, Ansonia, Conn., a corporation of Connecticut Application August 19, 1939, Serial No. 290,991

11 Claims. (Cl. 265—25)

This invention relates to improved means for obtaining visual indications of the relative angular motion between two parts of a rotating system. More particularly the invention pertains to an improved means for measuring accurately the torque deflection in a shaft system.

As heretofore practiced, the measuring of relative alterations in angular position between two coaxial rotating shafts or between two portions of one and the same rotating shaft has comprised affixing to one of said two shafts or shaft portions a therewith coaxial sleeve extending to the other shaft or shaft portion. The relative angular deflection between the two shaft portions has conventionally been indicated by the displacement of a reference line marked on the free end of the sleeve over a short scale marked on the shaft or shaft portion adjacent to the free end of the sleeve. This displacement has usually been observed visually through the slot of a stroboscopic screen rotating synchronously and in a suitably fixed phase relationship with said shaft or shaft portions.

The present invention contributes a major improvement to the above described prior art measuring device by substituting for said reference line a vernier scale coextensive with and having one more or fewer subdivisions than a scale corresponding to the one hereinabove indicated as conventionally used. The present invention further provides a disc coaxially affixed to the free end of said sleeve, for carrying on its periphery the novel added scale. According to the present invention the scale corresponding to the one conventionally used is marked on and preferably caused to extend over the whole periphery of a second disc slightly larger than the first disc and similarly affixed to the shaft or shaft portion adjacent the free end of the sleeve. Any relative angular deflection intermediate the points at which said larger disc and said sleeve are affixed is indicated, in the manner of a vernier measuring device, by the relative displacement of the subdivisions of the two scales marked on the adjacent but spaced concentric discs rotating synchronously in parallel planes.

The present invention also adds to the stroboscopic or equivalent devices heretofore used for visual observation of any angular deflection as shown on an ordinary scale, phase shifting means operative during the synchronous rotation of said stroboscopic devices and said two discs, whereby the slot or equivalent member of the stroboscopic devices used may be caused to rotate coincidentally with any desired point of the two peripheries of the two discs. This novel phase shifting device thus makes possible the stroboscopic reading of the amount of angular deflection as indicated by the coincidence of two subdivisional lines or markings in the two scales anywhere on the peripheries of the two discs.

It is thus an object of the present invention to provide a device for measuring with greatly improved occuracy the relative angular displacement between two parts of a rotating system.

A more specific object of the present invention is to provide a device for measuring the torque deflection in a shaft system by the relative displacement of two coextensive circular scales of which one has one more or fewer subdivisions than the other.

Another specific object of the present invention is to provide, in a measuring device of the type indicated, two adjacent but spaced discs coaxially affixed, respectively, to the free end of a sleeve attached to a torsion shaft and to that portion of said shaft adjacent said free end, for carrying said two scales.

Yet another specific object of this invention is to provide phase shifting means for the stroboscopic device employed to read said scales, to make possible the visual observation of any part of the peripheries of said two discs over which said scales extend.

Other and further objects of the present invention will become apparent to those skilled in the art from the following description and appended claims.

Measuring devices according to the present invention comprise, broadly speaking, a torsion shaft, a circular scale concentrically affixed to said shaft, a vernier scale coextensive with said scale, means fixedly connecting said vernier scale to said shaft at a point spaced from the point of attachment of said first scale to said shaft, stroboscopic means for reading said scales, and means operable during the rotation of said measuring device for varying the phase relationship between said scales and said stroboscopic means.

Specific examples of measuring devices embodying these principles are illustrated in the appended drawings, and are, in connection therewith, described in detail.

On the drawings:

Figure 1 is a fragmentary broken longitudinal cross-sectional view, with parts in elevation, of a torsion dynamometer embodying the principles of this invention.

Figure 2 is an enlarged fragmentary sectional view of the peripheries of the scale carrying discs of the device shown in Figure 1.

Figure 3 is an enlarged fragmentary elevational view taken along the line III—III of Figure 1.

Figure 4 is a vertical cross-sectional view taken along the line IV—IV of Figure 1.

Figure 5 is an enlarged fragmentary longitudinal sectional view of the phase shifting device also shown in Figure 1.

Figure 6 is an enlarged sectional view through one slot of the stroboscopic disc.

Figure 7 is an enlarged fragmentary elevational view taken along the line VII—VII of Figure 1.

Figure 8 is a top plan view of the phase shifting device together with means for operating the same according to one embodiment of this invention.

Figure 9 is a side elevational view, with parts in cross section, taken along the line IX—IX of Figure 8 and also showing the stroboscopic disc in elevation.

Figure 10 is an enlarged fragmentary elevational view of a modified form of scales.

Figure 11 is a cross-sectional view taken along the line XI—XI of Figure 10 and also illustrating a portion of the stroboscopic disc in cross-sectional view and a light bulb in elevation.

Figure 14 is a greatly enlarged fragmentary view taken along the line XIV—XIV of Figure 5.

As shown on the drawings:

Figure 12:
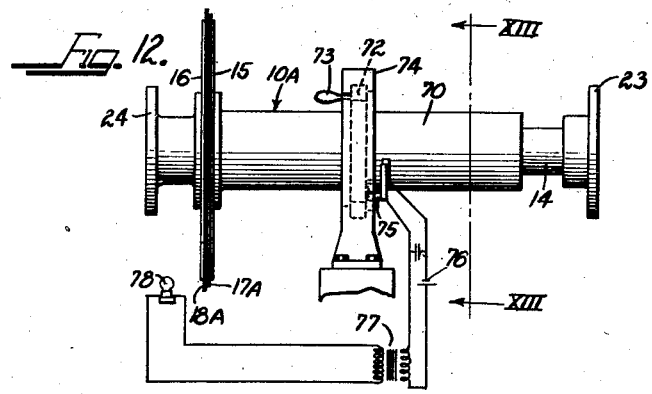
Figure 12 is a side elevational view of another measuring device embodying the principles of this invention.

In Figure 1 the reference numeral 10 indicates generally a torsion dynamometer embodying the principles of this invention. This dynamometer is shown in assembled relationship wtih spaced ends of coaxial driving and driven shafts 11 and 12. Principal parts of the dynamometer 10 comprise a torsion shaft 13 intermediate, coaxial with and operatively connected to the ends of the shafts 11 and 12, together with a sleeve 14 affixed to that end of the torsion shaft 13 adjacent the driving shaft 11 and extending in spaced concentric relationship with the shaft 13 toward the other end of the latter. A pair of adjacent but spaced discs 15 and 16 of unequal diameter are transversely and concentrically mounted, respectively, on the free end of the sleeve 14 and on that part of the torsion shaft 13 adjacent said free end. The discs 15 and 16 carry coextensive peripheral scales. The scale 17 on the smaller disc 15 has exactly 101 subdivisions as against exactly 100 subdivisions on the other scale 18. The sleeve 14 also carries a transverse and therewith concentric stroboscopic disc 19, and, operatively connected to the latter, a phase shifting device indicated generally by the reference numeral 20. This phase shifting device is suitably disposed intermediate the stroboscopic disc 19 and the fixed end of the sleeve 14.

As shown in Figure 1, the torsion shaft 13 is formed with enlarged end portions 13A and 13B, keyed, respectively, by feathers 21 and 22 to terminal collars 23 and 24.

The shaft end portion 13A is operatively connected to the driving shaft 11 by coupling means which may include a coupling member 25 spaced from the collar 23 by a ring 26 and secured together by bolts 27 and nuts 28. The other shaft end portion 13B may be similarly connected to the driven shaft 12.

The sleeve 14 extends intermediate the collars 23 and 24, one end 14A abutting the former, the other end 14B being closely spaced from the latter. Said sleeve 14 is attached to the shaft end portion 13A and to the collar 23 by its end 14A which is provided with a terminal flange 29 and by a ring 30 having its inside rabbeted to fit around the flange 29. The ring 30 extends around the sleeve 14 and around its terminal flange 29 in spaced relationship with the collar 23. The terminal surface of the sleeve 14 is held against the collar 23 by screws 31 extending through the ring 30 into threaded wells in the collar 23, in a manner adapted to permit relative rotational adjustment of the sleeve 14 with reference to the torsion shaft 13.

The distal or free end 14B of the sleeve 14 provides for the shaft end portion 13B an inner bearing surface 32 which may be lubricated through a fitting 32A.

A collar 34 is affixed on the outside of the sleeve end 14B by means of a set screw 33, and carries the herein above mentioned disc 15. The other larger disc 16 is fixed on the collar 24. Screws removably holding the discs 15 and 16 are indicated by the reference numeral 35.

The stroboscopic disc 19 and the phase shifting device 20 are carried, respectively, by two sleeves 36 and 37 mounted upon the sleeve 14 intermediate spaced rings 38 and 39, the stroboscopic disc 19 being removably affixed to the sleeve 36 by screws 40. A well parallel with the axis in the ring 38 contains a coil spring 41 urging the two sleeves 36 and 37 against the ring 39 with a force variable by the setting of a screw 42. The sleeve 37 is fixed relative to the sleeve 14 by a set screw 43. The sleeve 36 provides inner bearing surfaces 44 for the sleeve 14 and contacts the ring 38 and the sleeve 37 by terminal friction bearing surfaces 45.

As shown in Figures 1, 4 and 5, the phase shifting device 20 comprises a sleeve 46 having two radial flanges 47 and 48 and provided with a lubrication fitting 49. Said sleeve 46 is rotatably mounted on the sleeve 37. A drum 50 covering the periphery of the phase shifting device 20 is attached to the flanges 47 and 48. The latter flange also carries a terminal cover 51.

The phase shifting device 20 further includes a differential gear consisting of a pinion 52 enmeshed with differentially toothed wheels 53 and 54 affixed, respectively, to adjacent terminal portions of the sleeves 36 and 37 as shown in Figure 14, the gear wheel 53 has fewer gear teeth than the gear wheel 54. The pinion 52 is carried by an axially directed pin 55 journalled in ball bearings 56 disposed in the flanges 47 and 48. A pin 57 affixed in the flanges 47 and 48 diametrically opposite the pinion 52 counterbalances the latter.

As shown in Figures 1 and 6 the stroboscopic disc 19 is provided with two mutually counterbalancing members 58 slotted at 59. The two slots 59 are conveniently made of unequal width, to be used at various rates of rotation.

In Figures 1, 2 and 3 the reference numeral 60 indicates screws and nuts removably holding the preferably transparent scales 17 and 18 on the discs 15 and 16. Lines 61 are marked on transparent scale material to define the subdivisions of the scale.

Figures 2, 3 and 7 illustrate the coaction between the scale carrying discs 17 and 18 and between the same and the stroboscopic disc 19.

This dynamometer as a whole as well as its component parts are completely balanced dynamically.

The hereinabove described dynamometer functions as follows:

The sleeve 14 is first adjusted with reference to the torsion shaft 13 to aline the zero points of the two scales 17 and 18 as shown in Figure 7. One of the stroboscopic slots 59 is blanked out, for instance, with tape.

The rotation of the driving shaft 11 effects therewith synchronous rotation of the torsion shaft 13, driven shaft 12, sleeve 14, scale carrying discs 15 and 16, stroboscopic disc 19 and phase shifting device 20. When viewed through the slot 59 in the stroboscope, however, the scales 17 and 18 appear stationary.

Any angular deflection between the end portions 13A and 13B of the torsion shaft 13 is indicated by relative displacement of the scales 17 and 18 somewhere on whose peripheries a subdividing line from one scale coincides with a line from the other scale to make possible a reading in the manner of a vernier scale. The phase shifting device serves to vary at will, during the rotation of the assembly, the phase relationship between the stroboscopic disc and the scale carrying discs, so that the peripheries of the latter may be completely scanned and a reading obtained.

The phase shifting device 20 is actuated by a braking pressure on the drum 50, causing the sleeve 46 to be retarded relative to the sleeves 37 and 14. The gear wheel 54 then causes the pinion 52 to rotate whereby the gear wheel 53 having fewer teeth than the gear wheel 54, is caused to rotate at a different speed from that of the gear wheel 54. The two gear wheels being affixed to the sleeves 36 and 37, the resulting difference in rotational velocity is propagated to the same effecting a relative displacement as between the stroboscopic disc 19 and the scale carrying discs 15 and 16. When the braking pressure on the cover 50 is released, relative motion between the sleeves 36 and 37 ceases, being impeded by the friction bearings 45, and the stroboscopic disc is maintained in the resulting novel phase relationship with the scale carrying discs 15 and 16.

Figures 8 and 9 show convenient means for applying at will a slight braking pressure on the drum 50 from a point exterior to the dynamometer. Said means include two small leader belts 62 and 63 engaging, respectively, exterior idler pulleys 64 and 65 of slightly different diameter constrained to run at the same speed on a common shaft 66. The belts 63 running over the larger pulley 65 engages the sleeve 14 while the belt 62 running over the smaller pulley 64 engages the drum 50. The shaft 66 is mounted on a supporting lever 67 pivoted at 68. By slight manual pressure on the distal end of the the lever 67 to tighten the two belts 62 and 63 the phase shifting device 20 can be controlled very accurately.

The hereinabove described dynamometer may be varied in many details. For instance, the scales 17 and 18 may be provided with, respectively, exactly 99 and 100 or exactly 199 and 200, or any other combinations of numbers of subdivision adapted to give the very accurate reading of a vernier scale.

As illustrated in Figures 10 and 11, the dynamometer may also be provided with opaque scales 17A and 18A which, instead of having subdivisions marked by lines, are pierced by slots 61A. A reading of the scales is then effected by the aid of a source of light, for instance, an electric light bulb 69, placed behind the discs 17A and 18A, which emits rays of light visible only through coinciding slots 61A in the two discs.

Many other embodiments of the principles of the present invention are possible. For instance, the stroboscopic disc may be replaced by a source of light illuminating the scale carrying discs by exceedingly brief flashes of light emitted at intervals timed to synchronize with a definite phase of the rotation of said scale carrying discs. Separate means are also provided to vary at will the phase relationship between the rotating scale discs and the flashing of the light.

Figure 13:
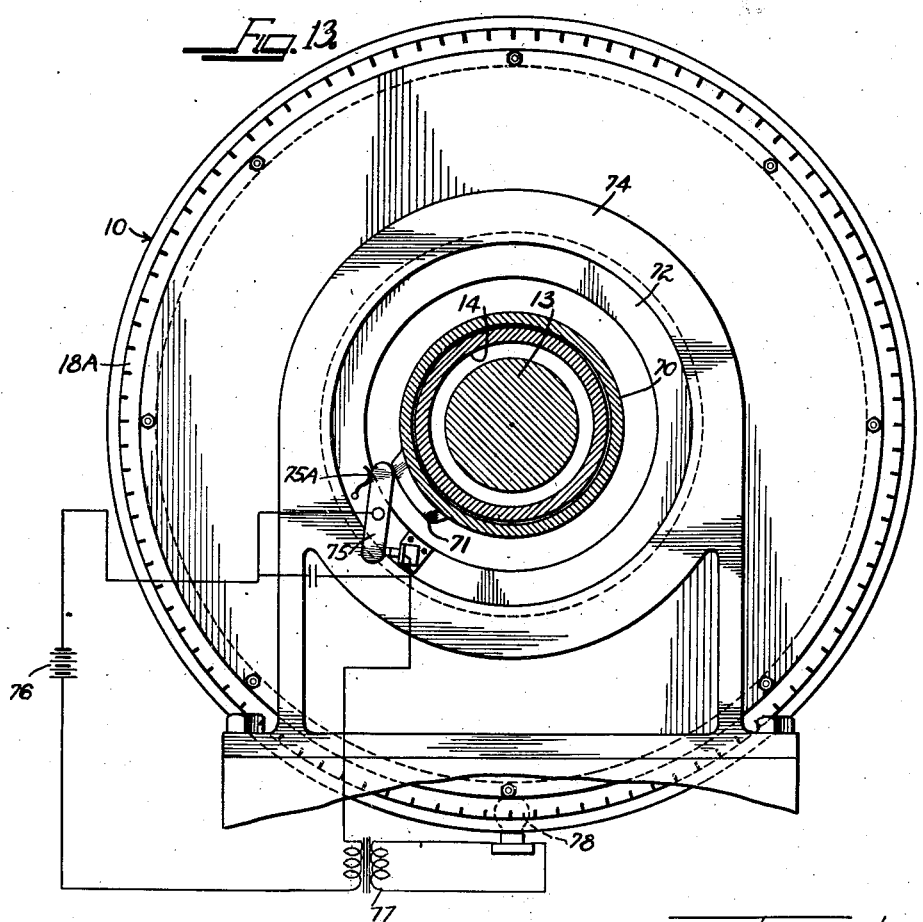
Figure 13 is a greatly enlarged sectional view taken along the line XIII—XIII of Figure 12.

Such a measuring device having opaque slotted scales is illustrated in Figures 12 and 13, in which reference numerals identical with those of previously described figures designate like parts, the description of which is not repeated. In this measuring device, indicated generally by the reference numeral 10A, the stroboscopic disc is replaced by a sleeve 70 carrying a cam 71. The sleeve 70 is surrounded by a second therefrom spaced ring 72 provided with a handle 73 and rotatably supported by the member 74. The ring 72 carries a breaker 75 projecting into the rotational path of the cam 71 where it is held by a spring 75A and operatively connected to a source of electric current 76 and to a transformer 77 energizing a flash tube 78 disposed behind the opaque slotted scales 17A and 18A.

In this measuring device any angular deflection between the ends 13A and 13B of the rotating torsion shaft 13 as indicated by a relative displacement of the scales 17A and 18A may be very accurately read by the flashes of the flash tube when the latter are put into proper phase relationship with the rotating scales by manual rotation of the ring 72 carrying the breaker 75. In this instance the breaker 75 is moved around the sleeve 70 until the tube 78 flashes at the exact moment when coinciding slots 60A pass the tube 78.

Many other embodiments of the principles of this invention will suggest themselves to those skilled in the art. However, the distinguishing features of the present invention comprise the combination of paired closely spaced preferably coextensive circular scales, one of which is adapted to coact with the other in the manner of a vernier scale, with a torsion shaft, with means fixedly connecting said scales concentrically to said shaft at spaced points, with stroboscopic means for reading said scales, and with phase shifting means operable during rotation of the measuring device to vary at will the phase relationship between said scales and said stroboscopic means.

Further features of the present invention comprise the employment of a sleeve as means for fixedly connecting one scale to a point on the torsion shaft remote therefrom and the use of said sleeve for supporting the stroboscopic means and the phase shifting means associated with the latter.

By the term "stroboscopic means" is signified any device permitting said scales to be seen intermittently at a frequency which is equal to, or a multiple of, the frequency of revolution of said scales. Stroboscopic means thus include both stroboscopic screens and intermittently flashing sources of light synchronized with the rotation of said scales.

Phase shifting means include all devices adapted to effect brief controlled retardation or acceleration of the rate of action of the stroboscopic means relative to said scales followed by resumption of synchronous action, to effect coincidence of the latter with any phase of the rotation of said scales.

Other salient features of the present invention comprise the optional provision of either transparent scales whose subdivisions are indicated by lines marked thereon or of opaque scales having subdivisions defined by narrow slots or other perforations.

Due to the fact that measuring devices according to the present invention are capable of indicating accurately very small angular deflections, the same may be constructed with relatively heavy torsion shafts. Disposition of the stroboscopic and phase shifting devices on the sleeve surrounding the torsion shaft results in a compact instrument distinguished by ease of operation.

Dynamometers according to the present invention have been found particularly suitable for measuring the power input into the reduction gears of marine propulsion systems.

As indicated hereinabove, various details of construction may be varied through a wide range without departing from the principles of this invention and it is, therefore, not the purpose to limit the patent granted hereon otherwise than necessitated by the scope of the appended claims.

I claim as my invention:

1. Dynamometer comprising a torsion shaft, a concentric sleeve having one end affixed to said shaft and a free end spaced therefrom a substantial distance from the point of attachment to said shaft, a disc concentrically affixed to said shaft at a point adjacent the free end of said sleeve and carrying a circular scale, a second disc affixed concentrically to the free end of said sleeve and carrying a second circular scale adapted to coact with said first scale in the manner of a vernier scale, stroboscopic means supported concentrically by said sleeve adapted to permit reading of said scales, and means supported concentrically by said sleeve for varying the phase relationship between said scales and said stroboscopic means during the rotation thereof.

2. Dynamometer comprising a torsion shaft, a concentric sleeve extending over said shaft and having one end affixed thereto and a free end remote from the point of attachment of said sleeve to said shaft, a disc concentrically affixed to said shaft at a point adjacent the free end of said sleeve and carrying a circular scale, a second disc concentrically affixed to the free end of said sleeve and carrying a second circular scale coextensive with said first scale and having a number of subdivisions differing by one from that of said first scale, a stroboscopic disc concentrically carried by said sleeve, and means disposed on said sleeve for varying the phase relationship between said scale carrying disc and said stroboscopic disc during the rotation thereof.

3. Dynamometer comprising a torsion shaft, a sleeve having one end affixed to said shaft and extending a free end in concentric spaced relationship with said shaft to a point on said shaft remote from the point of attachment of said sleeve thereto, a disc concentrically affixed to said shaft at a point adjacent the free end of said sleeve and carrying a circular scale, a second disc concentrically affixed to the free end of said sleeve and carrying a second circular scale coextensive with said first scale and adapted to coact with the latter in the manner of a vernier scale, a stroboscopic disc rotatable around said sleeve with considerable friction, and means for varying the phase relationship between said scale carrying discs and said stroboscopic disc comprising a gear wheel operatively connected to said stroboscopic disc, a second gear wheel provided with a greater number of teeth than said first wheel and fixedly connected to said sleeve adjacently said first wheel, an annular member adapted to be subjected to braking pressure freely rotatable around said sleeve and a pinion journalled in said annular member and engaging said two gear wheels.

4. Dynamometer comprising a torsion shaft having enlarged ends, a sleeve having one end affixed to one of said enlarged shaft ends and extending in concentric spaced relationship with said shaft to the other of said enlarged shaft ends, a disc concentrically affixed to said last mentioned shaft end and carrying a circular scale, a second disc affixed to the distal end of said sleeve and carrying a second circular scale coextensive with said first scale and adapted to coact with the latter in the manner of a vernier scale, a stroboscopic disc rotatable with considerable friction around said sleeve, and means for varying the phase relationship between said scale carrying discs and said stroboscopic disc comprising an annular member freely rotatable around said sleeve adapted to receive braking pressure, a pinion journalled in said annular member, and two differentially toothed gear wheels engaging said pinion and connected, respectively, operatively to said stroboscopic disc and fixedly to said sleeve.

5. Dynamometer comprising a torsion shaft, a sleeve having one end affixed to said shaft and extending in concentric spaced relationship with said shaft to a point thereon remote from the point of attachment of said sleeve to said shaft, a disc concentrically affixed to said shaft at a point adjacent the distal end of said sleeve and carrying a circular transparent scale, a second disc concentrically affixed to the distal end of said sleeve and carrying a second circular transparent scale coextensive with said first scale and adapted to coact with the latter in the manner of a vernier scale, a stroboscopic disc rotatable over said sleeve, a gear wheel rotatable over said sleeve and operatively connected to said stroboscopic disc, a second gear wheel fixedly connected to said sleeve adjacent said first gear wheel and provided with more teeth than the latter, an annular member comprising a peripheral drum rotatable around said sleeve, a pinion journalled in said annular member and engaging said two gear wheels, and means for applying a braking pressure on said peripheral drum.

6. Dynamometer comprising a torsion shaft, a sleeve having one end affixed to said shaft and extending in spaced concentric relationship with said shaft to a point thereon remote from the point of attachment of said sleeve to said shaft, a circular scale fixedly and concentrically connected to said shaft at a point adjacent the distal end of said sleeve, a second circular scale coextensive with said first scale adapted to coact with the same in the manner of a vernier scale and concentrically and fixedly connected to the distal end of said sleeve, a stroboscopic disc rotatably and concentrically carried by said sleeve, and means for briefly retarding the rotation of said stroboscopic disc in relation to said scales, to vary the phase relationship therebetween.

7. Dynamometer according to claim 6 wherein said circular scales are opaque and subdivided by perforations.

8. Dynamometer comprising a torsion shaft, a sleeve having one end affixed to said shaft and extending in spaced concentric relationship with said shaft to a point thereon remote from the point of attachment of said sleeve to said shaft, an opaque circular scale subdivided by perforations and fixedly and concentrically connected to said shaft at a point adjacent the distal end of said sleeve, a second opaque circular scale subdivided by perforations, coextensive with said first scale, adapted to coact with the same in the manner of a vernier scale and concentrically and fixedly connected to the distal end of said sleeve, stroboscopic means for reading said scales comprising an electric flash tube, an electric circuit breaker operatively connected thereto, a cam supported by said sleeve adapted to actuate said breaker on rotation of said sleeve, and means for selectively positioning said breaker at any point of the rotational path of said cam.

9. Dynamometer comprising a torsion shaft, a sleeve having one end affixed to said shaft and extending in concentric spaced relationship with said shaft to a point thereon remote from the point of attachment of said sleeve to said shaft, a disc concentrically affixed to said shaft adjacent the distal end of said sleeve and carrying an opaque circular scale subdivided by perforations, a second disc concentrically affixed to the distal end of said sleeve and carrying a second opaque circular scale subdivided by perforations, coextensive with said first scale and adapted to coact with the same in the manner of a vernier scale, a cam fixedly connected to said sleeve, a manually rotatable annular member supported in spaced concentric relationship with said sleeve outside the rotational path of said cam, an electric circuit breaker carried by said annular member so as to project into the rotational path of said cam for actuation thereby, an electric circuit operatively connected to said breaker, and an electric flash tube in said circuit and positioned adjacently said first scale at the face thereof away from said second scale.

10. Device for measuring the torque deflection in a rotating shaft system comprising a torsion shaft, paired spaced circular scales, one of said scales being adapted to coact with the other in the manner of a vernier scale, stroboscopic means for reading said scales, phase shifting means operable during rotation to vary the phase relationship between said scales and said stroboscopic means, means for connecting said scales concentrically to said shaft at spaced points and means for supporting said stroboscopic means and said phase shifting means concentrically about said shaft.

11. Device for measuring the torque deflection in a rotating shaft system comprising a torsion shaft, a circular scale concentrically affixed to said shaft, a vernier scale, means fixedly and concentrically connecting said vernier scale to said shaft at a point spaced from the point of attachment of said first scale to said shaft, stroboscopic means for reading said scales, means operable during rotation for varying the phase relationship between said scales and said stroboscopic means, and means for supporting said stroboscopic means and said phase relationship varying means concentrically about said shaft.

EMIL R. GASSER.